United States Patent [19]

Pollack

[11] Patent Number: 5,312,140
[45] Date of Patent: May 17, 1994

[54] FLUID SWIVEL STRUCTURE
[75] Inventor: Jack Pollack, Camarillo, Calif.
[73] Assignee: Imodco, Inc., Calabasa Hills, Calif.
[21] Appl. No.: 979,173
[22] Filed: Nov. 20, 1992
[51] Int. Cl.⁵ .............................................. F16L 35/00
[52] U.S. Cl. ...................................... 285/93; 285/98; 285/190; 285/422; 277/1
[58] Field of Search ................... 285/98, 136, 134, 190, 285/281, 422; 277/1

[56]      References Cited
        U.S. PATENT DOCUMENTS 4,647,077  3/1987  Ethridge et al. ........................ 285/98
4,828,292  5/1989  Jansen .
4,925,219  5/1990  Pollack et al. ..................... 285/98 X

FOREIGN PATENT DOCUMENTS 2229784  10/1990  United Kingdom ................. 285/136
8600972   2/1986  World Int. Prop. O. .......... 285/136
9002289   3/1990  World Int. Prop. O. .......... 285/136

Primary Examiner—Dave W. Arola
Attorney, Agent, or Firm—Arthur Freilich; Robert D. Hornbaker; Leon D. Rosen

[57]                ABSTRACT

A fluid swivel is described, of the type which includes a ring-shaped outer structure (12, FIG. 2) that rotates about a ring-shaped inner structure (14), and which form an annular chamber (18) between them and a pair of gap passages (24, 26) between them which are sealed by pressure seals (30, 32). The outer structure includes a body (70) forming part of the annular chamber and a seal ring (72) mounted on an end of the body and abutting one side of the pressure seal. The seal ring is axially shiftable on the end of the body, so that when the body expands radially as a result of high pressure fluid being introduced into the annular chamber, the seal ring does not have to expand a similar amount and therefore does not have to cause a large increase in the width of the extrusion gap (62) at the downstream end of the pressure seal. A centering mechanism (110) urges the seal ring to remain substantially centered on the body, and can be formed by a ring of compressible material lying between shoulders (120, 122, FIG. 3) respectively on the body and on the seal ring, or can be formed by leaf spring portions (154, FIG. 5) of one of the parts. Registers (180, 182) on the seal ring and on the body can engage each other to assure concentricity when the body has expanded a predetermined amount under a predetermined high pressure of at least 50 atmospheres in the annular chamber.

20 Claims, 4 Drawing Sheets

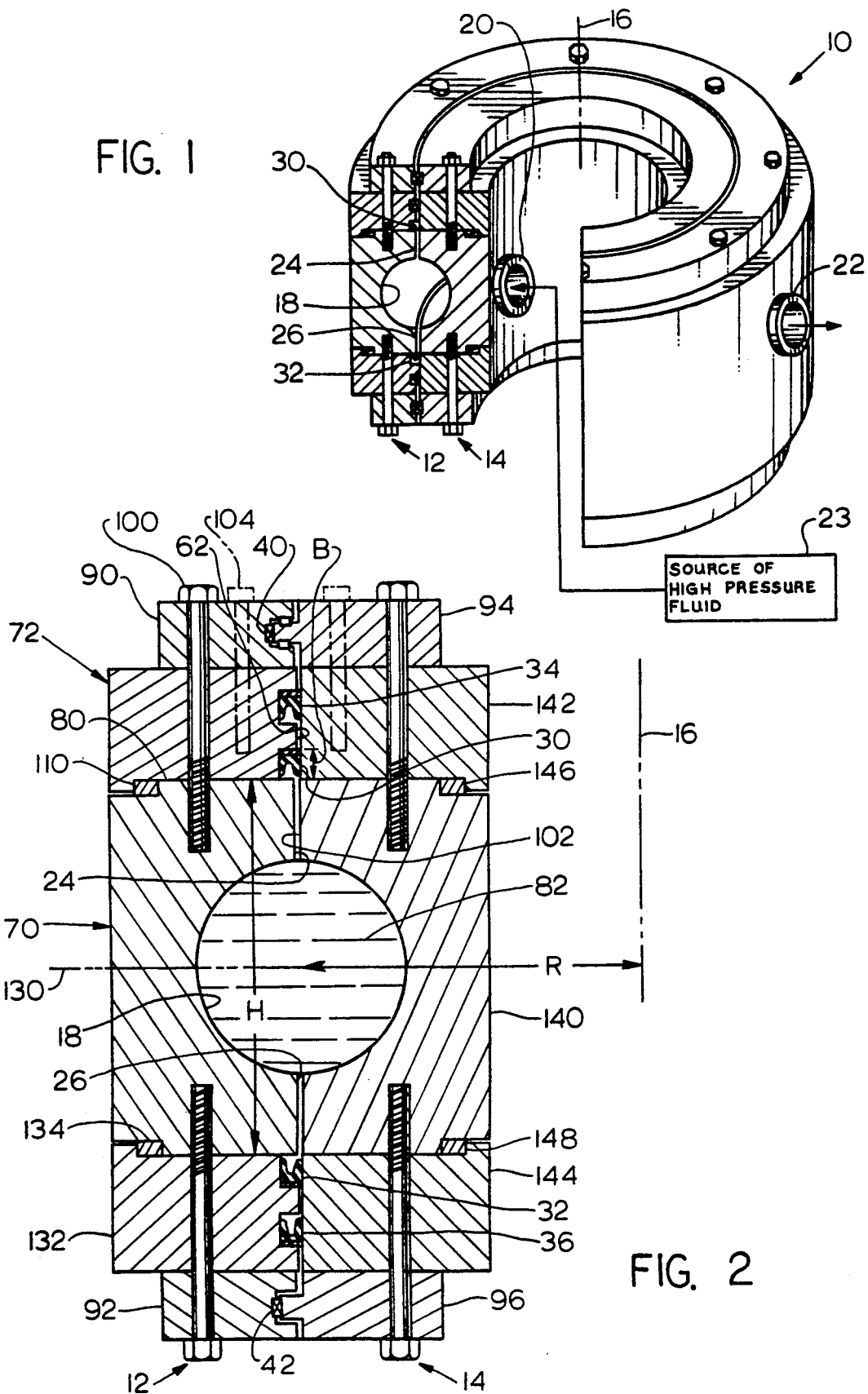

FLUID SWIVEL STRUCTURE

BACKGROUND OF THE INVENTION

Fluid swivels are commonly used in offshore installations to transfer gas and oil between a fixed underwater pipeline and a tanker that may drift around the installation. A typical fluid swivel includes ring-shaped inner and outer walls, or structures, forming an annular chamber between them, and forming a pair of gap passages extending from opposite sides of the chamber to the environment. A pressure seal is placed along each gap passage. A common type of pressure seal is a radial seal with opposite sides that press against radially spaced surfaces as one structure (e.g. the outer structure) slowly rotates about the other one. Although face seals are sometimes used which seal against axially-spaced surfaces, radial seals are often preferred because they commonly result in fewer separate parts that are easier to machine, and because fluid swivels with radial seals are generally easier to design.

The radial pressure seal has an upstream side exposed to the same pressure as that which exists in the annular chamber, and has a downstream side which is generally at ambient pressure (one atmosphere). Where fluid in the annular chamber is at moderate to high pressure, there is a tendency for the pressure seal to extrude into the portion of the gap passage lying immediately downstream of the pressure seal, which can be referred to as the "extrusion gap". To avoid extrusion, the extrusion gap is made as narrow as possible.

When high pressure fluid lies in the annular chamber formed between the inner and outer structures, the outer structure tends to slightly increase in diameter, while the inner structure tends to slightly decrease in diameter. Thus, the high pressure fluid tends to separate the inner and outer structures, which increases the thickness of the gap passage, including the extrusion gap. Any increase in thickness of the extrusion gap can result in a significant decrease in the life of the pressure seal. It may be noted that it is possible to orient the extrusion gap so it extends radially, but this can complicate construction of the fluid swivel. A fluid swivel that used radial seals and which was designed to hold high pressure fluid (at at least 50 atmospheres), which minimized changes in the width of the extrusion gap which lies immediately downstream of a pressure seal, would be of considerable value.

SUMMARY OF THE INVENTION

In accordance with one embodiment of the present invention, a fluid swivel is provided, of the type that includes a radial seal along each gap passage, which minimizes increase in the thickness of the extrusion gap portion of the gap passage when a high pressure is applied to the fluid swivel. The fluid swivel includes inner and outer structures rotatable with respect to each other about an axis, and forming an annular chamber and gap passages extending from opposite sides of the chamber to the environment. One of the structures such as the outer one includes a body forming the outer portion of the annular chamber and a separate seal ring which seals against one side of the pressure seal. The seal ring can shift position radially relative to the body, so as the body expands under the force of high pressure fluid, the seal ring does not have to similarly expand. A rubber sheet between the body and seal ring enables such shifting without substantial friction. By avoiding large expansion in diameter of the outer seal ring, the fluid swivel avoids a large increase in the thickness of the extrusion gap.

A centering mechanism couples the body to the seal ring, and urges the seal ring radially to tend to keep it substantially centered on the body as the body expands in diameter but the seal ring does not expand as much. One centering mechanism comprises a compressible ring with radially inner and outer surfaces respectively abutting shoulders on the body and on the seal ring. Another centering mechanism includes a leaf spring extending from one of the parts such as the seal ring to the other part such as the body, to bias them towards concentricity while allowing the body to expand more than the seal ring.

The body and seal ring can include registers that engage each other to precisely center the seal ring on the body, only after the body has expanded by a predetermined amount, which it attains only when the pressure in the annular chamber reaches a predetermined high pressure which is at least 50 atmospheres.

The novel features of the invention are set forth with particularity in the appended claims. The invention will be best understood from the following description when read in conjunction with the accompanying drawings.

BRIEF DESCRIPTION OF THE DRAWINGS

FIG. 1 is a sectional isometric view of a fluid swivel constructed in accordance with one embodiment of the invention.

FIG. 2 is a partial sectional view of the fluid swivel of FIG. 1.

DESCRIPTION OF THE PREFERRED EMBODIMENTS

Figure 3:
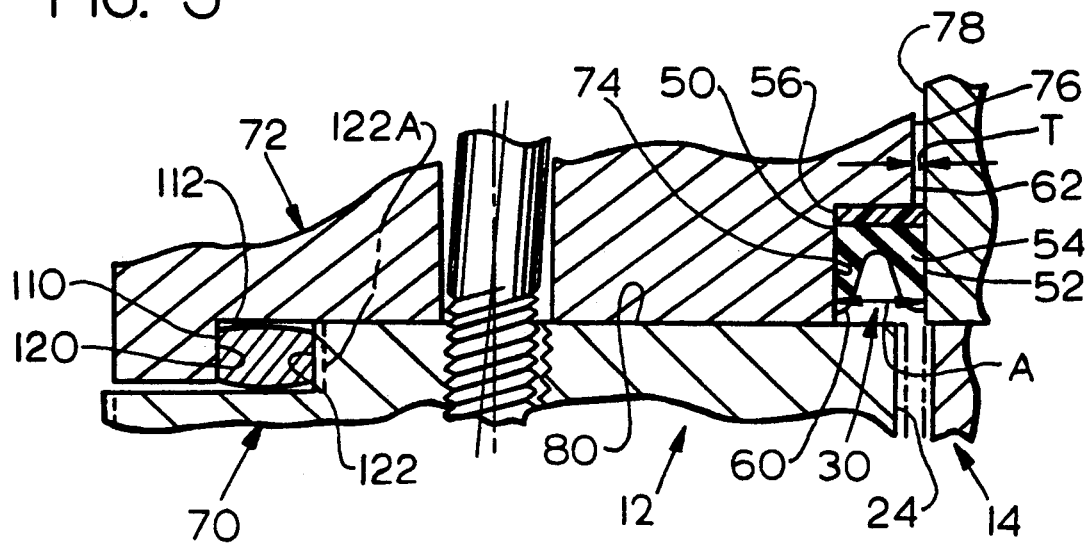
FIG. 3 shows a portion of FIG. 2 with the solid lines showing the positions of the parts when there is a high fluid pressure in the fluid swivel, and the phantom lines showing the positions of the part when there is a low fluid pressure in the fluid swivel.

FIG. 1 illustrates a fluid swivel 10 which includes an outer wall or structure 12 that can rotate relative to an inner wall or structure 14 about a vertical axis 16. The structures form a fluid-carrying annular chamber 18 between them. Fluid can enter the chamber through a relatively stationary inlet pipe 20 and can exit from the chamber through an outlet pipe 22 that can rotate about the axis 16. The fluid swivel is constructed to enable the passage of high pressure fluid (e.g. at least about 50 atmospheres) from a source 23 such as an undersea hydrocarbon well. The fluid swivel forms two gaps or gap passages, including an upper gap passage 24 and a lower one 26. As also shown in FIG. 2, the fluid swivel includes a pair of primary seals 30, 32 that each lies along one of the gap passages, to avoid the leakage of high pressure fluid from the chamber 18 and along a gap passage into the environment. A pair of secondary seals 34, 36 back up the primary seals. Bearings 40, 42 rotatably support the outer structure on the inner one.

When fluid under high pressure, of at least about 50 atmospheres (735 psi) is admitted into the annular chamber 18, the high fluid pressure urges the outer structure 12 to expand and the inner structure 14 to contract. If each structure 12, 14 had all portions thereof rigidly fixed together, then there could be a substantial increase in the thickness of each gap passage such as 24 lying between the inner and outer structures. This could shorten the lifetime of the pressure seals such as 30.

As shown in FIG. 3, the pressure seal 30 has radially-spaced (with respect to axis 16) outer and inner sides 50, 52 which bear respectively against surfaces of the outer and inner structure 12, 14. The pressure seal 30 include a seal part 54 of relatively soft material such as moderate hardness rubber, and a backup ring 56 of harder material such as hard rubber. The pressure of fluid against the upstream end 60 of the seal causes the seal part 54 to tightly expand against opposite sides of the gap passage 24. The pressure on the pressure seal also presses the backup ring 56 upwardly, and tends to cause one side of the backup ring to extrude into a gap passage portion 62 at the downstream side of the pressure seal. The gap passage portion 62 is sometimes herein referred to as the "extrusion gap" because the pressure seal tends to extrude into this gap. The fluid swivel is constructed so the thickness T of the axially-extending extrusion gap 62 is as small as possible.

As mentioned above, when high pressure fluid is applied to the annular chamber 18 (FIG. 2) the outer structure 12 tends to expand while the inner structure 14 tends to contract, all of which tends to increase the thickness of the gap passage 24. As also mentioned above, it is important to maintain the extrusion gap 62 of the gap passage as small as possible, to avoid extrusion of the pressure seal 30. Expansion of the extrusion gap 62 can be minimized by constructing each structure 12, 14 of the fluid swivel, and especially the outer structure 12, of a plurality of separate parts. The outer structure 12 includes a body 70 which forms part of the annular chamber 18. The outer structure also includes a separate seal-holding ring 72 which forms one side 74 (FIG. 3) of the gap passage portion against which the pressure seal 30 seals, and which also forms one side 76 of the extrusion gap 62 into which the backup ring 56 of the pressure seal 30 is in danger of extruding. The seal ring 72 is mounted on an end 80 of the body 70 only to prevent the seal ring 72 from moving axially (parallel to the axis 16) relative to the body 70.

In accordance with the present invention, expansion of the extrusion gap 62 is minimized by allowing the seal ring 72 to shift radially (so one side or all of the seal ring moves towards or away from the axis 16) with respect to the body 70. As a result of this construction, when high pressure fluid enters the annular chamber 18, causing the body 70 to expand radially outwardly, the seal ring 72 does not have to similarly expand. Instead, all portions of the seal ring slide radially inwardly relative to the end of the body 70, to avoid radially outward expansion of the seal ring 72. This enables the side 76 (FIG. 3) of the extrusion gap to remain close to the other side 78 of the extrusion gap, to minimize increase in the thickness T of the extrusion gap. Thus, even when the body 70 expands in diameter, the seal ring 72 does not have to undergo a corresponding expansion in diameter, and the extrusion gap 62 can retain a small thickness T.

The forces tending to expand the body 70 (FIG. 2) equal the pressure of the fluid 82 in the chamber 18, times the height H of the body 70, times the average circumferential length (the length $2\pi R$ along 360° of the annular chamber) of the inner side of the body. In one fluid swivel that applicant has designed, where the radius R of the annular chamber was about two feet (about 0.6 meter) and the height H of the body was also about two feet, a 50 atmospheres pressure of fluid in the chamber 18 resulted in a radially outer force on the body 70 of about 18,000 pounds. Where the body 70 is constructed with walls of only moderate thickness to minimize weight, the expansion of the body can be substantial, especially at higher pressures which may exceed 5,000 psi (340 atmospheres). In one example, the pressure seal 30 has a radial thickness A of one inch (2.5 cm) and the extrusion gap has a thickness T of 0.010 inch (0.25 mm) when the pressure of fluid (air) in the chamber is at one atmosphere. At a high pressure such as 50 atmospheres or more, the body 70 whose inner diameter is about four feet, may expand in radius by 0.010 inch or more. This could cause the thickness T of the extrusion gap 62 to double in thickness, and thereby greatly decrease the lifetime of use of the pressure seal. By avoiding expansion of the seal ring 72 in the same amount as the body 70, applicant minimizes increase in the thickness of the extrusion gap.

Each of the bearings 40, 42 has one side connected to an outer bearing ring 90, 92 and an opposite side connected to an inner bearing ring 94, 96. The particular bearings shown comprise rollers (which may be tapered) that roll against surfaces on the opposed bearing rings. The bearings such as 40 are constructed to keep all parts of the outer structure 12 substantially concentric with the inner structure 14, to avoid rubbing of steel surfaces anywhere else along the gap passage 24, except at the seals 30-36. Any hard rubbing of steel surfaces can cause high friction which resists turning of the outer structure about the inner one. A group of outer bolts 100 uniformly spaced about the axis 16, serve as a connecting device that connects the bearing ring 90 to the seal ring 72 and to the body 70. The bolts 100 are constructed to keep the bearing ring 90 and seal ring 72 precisely concentric, to avoid rubbing of closely spaced surfaces at the extrusion gap 62. However, the thickness of the gap passage portion 102 at the body 70 is much larger, than that of the extrusion gap 62 and the outer bolts 100 enable some sideward shifting of the body 70 with respect to the seal ring 72.

Figure 4:
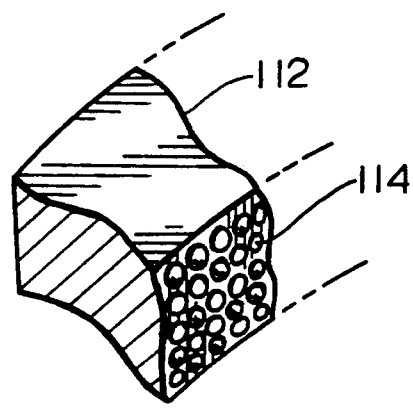
FIG. 4 is a partial isometric view of a spring device of the apparatus of FIG. 3.

In order to prevent considerable eccentricity of the body 70 with respect to the bearing ring 90 and the seal ring 72 (which remains precisely concentric with the bearing ring 90) applicant provides a centering mechanism 110 which urges the seal ring 72 radially (urges locations on the seal ring towards or away from the axis 16) to keep the seal ring 72 substantially centered on the body 70, as the body expands and contracts. The centering mechanism shown in FIG. 3 appears to be in the form of a block 112 as seen in a sectional view, and is preferably in the form of a ring having a largely rectangular cross section (although the ring can have gaps). The block form or ring 112 is resiliently compressible in a radial direction. If only light forces were encountered, the block ring 112 could be formed of rubber, but because of the large forces encountered, applicant constructs the block ring 112 of a harder material which is less stiff than steel, such as aluminum, which has a modulus of elasticity of 10 million psi, as compared to the modulus of elasticity of steel which is about 30 million psi. As shown in FIG. 4, the elasticity of the ring 112 in the radial direction can be increased by forming numerous holes 114 which reduce the effective cross sectional area to be compressed. Referring to FIG. 3, the ring 112 lies between shoulders 120, 122 respectively on the seal ring 72 and on the body 70. As the body 70 expands in radius, its shoulder 122 moves from the initial position 122A to the position 122, thereby causing radial compression of the ring 112. Due to the resilience of the ring material, it encourages the seal ring and body to remain substantially concentric even as the shoulder 122 approaches the shoulder 120.

The outer structure 12 shown in FIG. 2 is substantially symmetrical about a horizontal plane 130, and includes a lower seal ring 132 which is substantially rigidly fixed to the lower bearing ring 92, and which is coupled by a centering mechanism 134 to the lower end of the body 70. The inner structure 14 is constructed somewhat similarly to that of the outer structure, in that it includes a body 140 upper and lower seal rub rings 142, 144 each coupled to an end of the body by a centering mechanism 146, 148. Each seal rub ring 142, 144 is substantially rigidly connected to a corresponding bearing ring 94, 96. It is noted that the outer seal ring 72 may be referred to as a seal-holding ring because it has grooves which hold the pressure seals 30, 34. the inner seal ring 142 may be referred to as a rub seal ring or rub ring, because it merely rubs against the pressure seals 30, 34 as they turn with the outer seal ring 72.

Each seal ring 72, 142 may be referred to as a "seal abutting ring" to indicate that it abuts one side of a pressure seal such as 30.

There is some tendency for the seal ring such as 72 to expand when high pressure is applied to the annular chamber 18. This is because the high pressure is applied to the seal ring along most of the height B of the pressure seal. However, most of the height of the seal ring 72 is not exposed to the high pressure, so the expansion of the seal ring 72 is much less than that of the outer body 70. The parts of the inner structure 14 contract less than the amount by which corresponding parts of the outer structure 12 expand.

Figure 5:
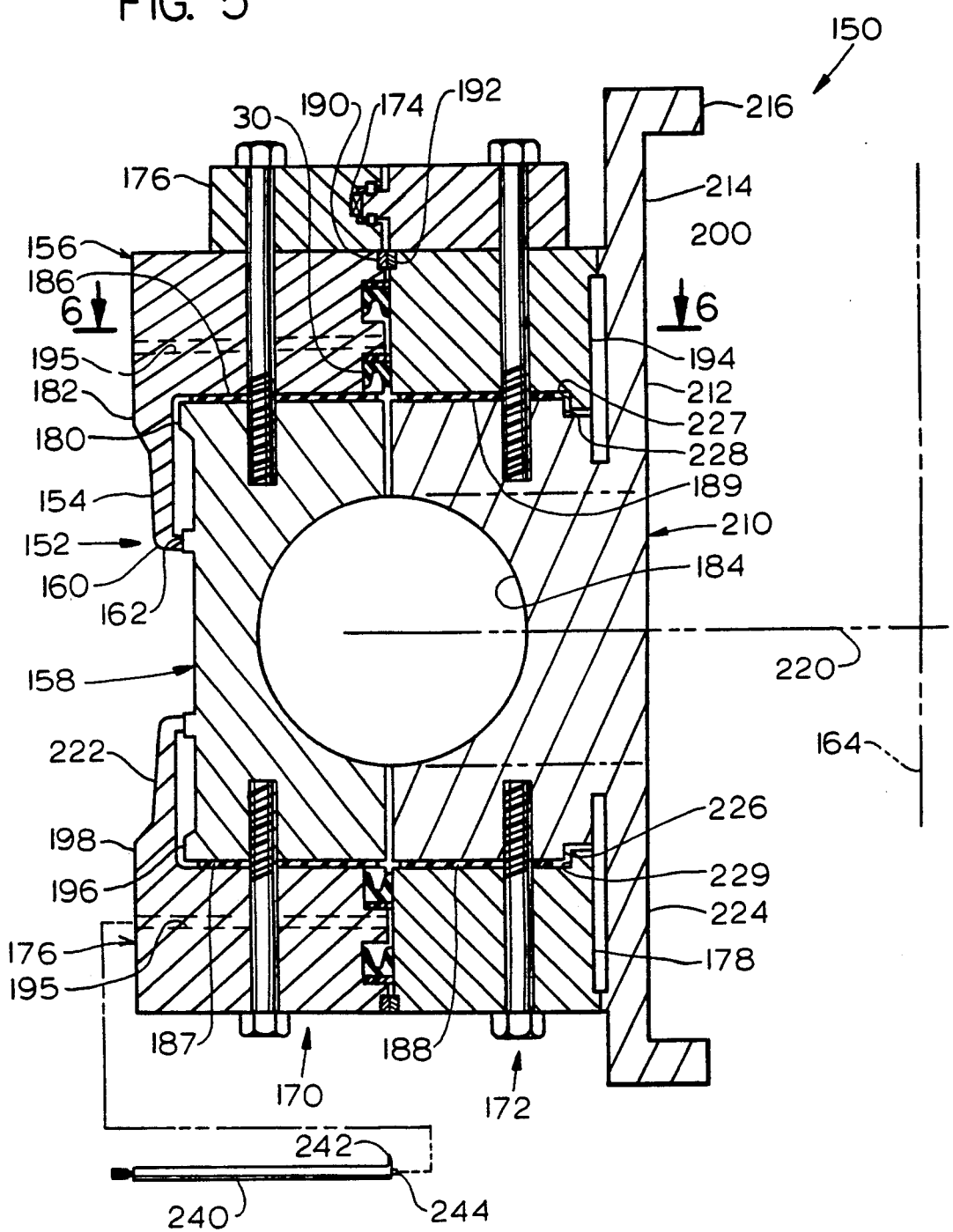
FIG. 5 is a partial sectional view of a fluid swivel constructed in accordance with another embodiment of the invention.

FIG. 5 illustrates part of another fluid swivel 150, where the centering mechanism 152 includes a leaf spring 154 formed as part of the seal ring 156 and extending around the outside of the body 158. The leaf spring 154 can extend continuously around the body 158, so the leaf spring tends to not expand even as the seal ring 156 expands slightly. The leaf spring will resist expansion even if there are gaps in it, though not as strongly. The leaf spring 154 has a lower or outer end 160 which bears against a surface 162 on the body 158. As the body 158 expands radially with respect to the axis of rotation 164, the surface 162 deflects the outer end 160 of the leaf spring 154 radially outwardly to bend the spring. The leaf spring 154 and body surface 162 each preferably extend 360° around the axis 164. If the body 158 should tend to shift so it is eccentric with respect to the axis 164, then one side of the body would tend to deflect one side of the leaf spring 154 excessively, and that side of the leaf spring would greatly resist such deflection and tend to center the body 154 on the seal ring 156.

During most of the useful lifetime of the fluid swivel, when the outer structure 170 might turn with respect to the inner structure 172, the fluid swivel is carrying fluid under high pressure (at least about 50 atmospheres). It is during such time when it is most desirable that the seal ring 156 (which is always closely concentric with the bearing 174 and bearing ring 176) remain closely concentric with the body 158. This is especially so because the lower seal ring 176 is not directly mounted on any lower bearing, but depends on concentricity of the body 158 to maintain it concentric with the lower seal ring 178 of the inner structure. To maintain concentricity when high fluid pressure is present, applicant provides registers 180, 182 respectively on the body 158 and on the seal ring 156 which engage each other only when a predetermined high fluid pressure lies in the annular chamber 184. Preferably, the registers 180, 182 engage each other when nearly full pressure is applied.

In one example, where the fluid swivel is designed to carry fluid from an underground well which is known to supply fluid at a pressure of about 200 atmospheres (2940 psi), applicant forms the registers 180, 182 so they will tightly engage each other when a pressure of 193 atmospheres (2800 psi) is reached. This assures that at design pressure of 200 atmospheres, the body 158, seal ring 156, and bearing ring 176 will be closely concentric. Actually, when fluid passes at a substantial flow rate, the pressure in the fluid swivel will be somewhat below design pressure.

Applicant prefers to provide a pair of bushings 190, 192 formed of bearing material such as aluminum bronze, at the seal ring 156 and seal rub ring 194, to assure concentricity of the rings 156, 194. Preferably, there is a small gap such as 0.010 inch between the bushings 190, 192 at zero pressure, to minimize friction, so the bushings serve only to prevent great eccentricity of the rings 156, 194 in a worse case condition. The lower seal ring 176 is maintained concentric with the body 158 by another set of registers 196, 198 which engage when the predetermined high pressure (e.g. 193 atmospheres) is reached.

Figure 6:
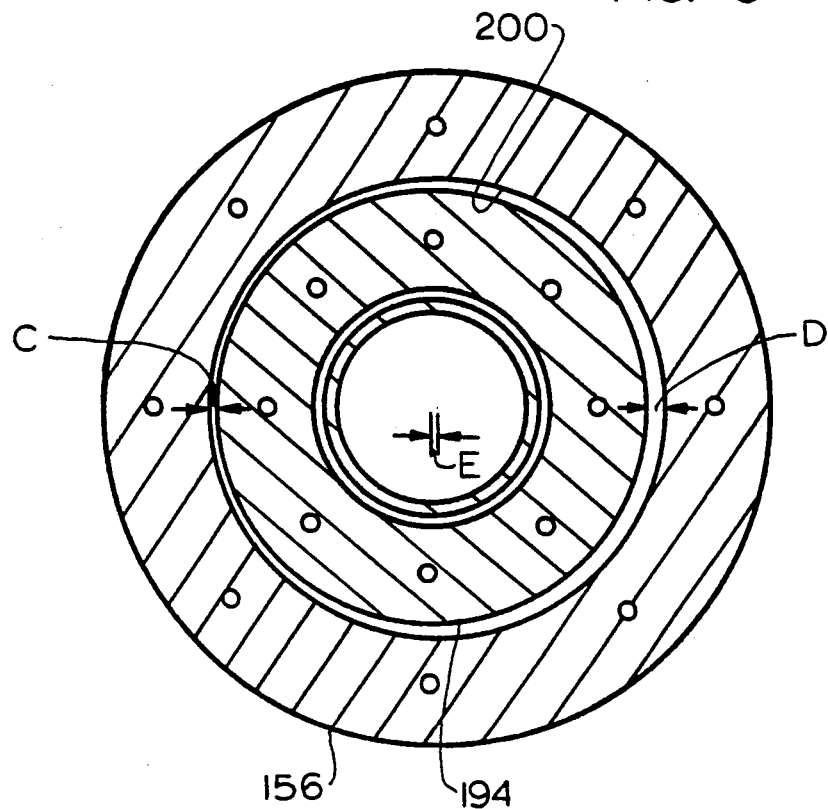
FIG. 6 is a view taken on the line 6—6 of FIG. 5, and showing the effect of slight eccentricity of the two seal rings thereof.

FIG. 6 shows how the thickness of the extrusion gap 200 can vary, between an especially small amount at C and an especially large amount at D if there is even moderate eccentricity of the two seal rings 156, 194. In the case of FIG. 6, the small amount of eccentricity E will have the undesirable effect of allowing the side of the pressure seal which is of the thickness D to extrude thereat. Thus, maintaining close concentricity can prevent a large extrusion gap anywhere around the 360° extent of the pressure seal to minimize extrusion and assure a long lifetime of use of the pressure seal.

FIG. 5 shows that the inner body 210 of the inner structure 172 is maintained substantially concentric with the rub ring 194 by another leaf spring 212 which has an end part 214 that lightly touches a surface on the rub ring 194. The leaf spring 212 has a top forming a flange 216 for mounting another fluid swivel on the fluid swivel 150. When the pressure of fluid in the annular chamber 184 increases, the inner body 210 moves inwardly (by about half as much as the outer body moves outwardly). However, the inner spring 214 tends to not move (because it is a preferably continuous ring) and resists inward motion of inner body 210. As a result, the inner spring 214 remains lightly touching the rub ring 194, to keep it concentric with the inner body. Should the rub ring 194 start to shift eccentrically, the inner leaf spring 214 would oppose such eccentric movement and urge the rub ring 194 to remain concentric with the inner body 210.

The fluid swivel 150 is symmetric about an imaginary central horizontal plane 220, so the lower part of the fluid swivel also has leaf springs shown at 222 and 224. Concentricity of the inner structure 172 with the outer one is assured at maximum, or design pressure, by registers 226-229. The gap between pairs of registers such as 226 and 229, is designed to close at a pressure just below the design pressure.

When the outer body 158 expands substantially but the seal ring 156 does not expand as much, then locations on the top of the body must shift radially outwardly with respect to adjacent locations on the bottom of the seal ring. Although friction could be reduced by assuring good surface finishes, such friction is unpredictable. Applicant assures that such shifting will occur by locating a thin elastomeric (rubber) layer or sheet 186 between them. An elastomeric material has a modulus of elasticity on the order of 3,000 psi or less, and typically of about 500 psi. The opposite faces of the elastomeric sheet are preferably vulcanized to a pair of thin metal sheets to facilitate handling. The elastomeric sheet is compressed between the body and seal ring and deforms as the body expands more than said seal ring while sealing the space between them. The low resistance to shear of the elastomeric sheet 186, provides very low equivalent resistance to shifting. Its presence can sometimes eliminate the need for the springs, as the rubber sheet 186 can apply sufficient force to maintain concentricity. In that case, zero pressure registers are desirable to assure concentricity at zero pressure. Similar other elastomeric sheets 187-189 are provided for the other rings 176, 178 and 194.

It is highly desirable that a simple way be available to confirm that the seal holding ring 156 and seal rub ring 194 remain closely concentric. This can be accomplished by providing at least three locations for measuring the size of the extrusion gap. Applicant provides three drilled inspection ports 195 which extend from the outside to the extrusion gap, through which a gap measurement instrument can be inserted, such as a depth micrometer. The ports 195 are uniformly spaced (by 120°) about the swivel axis 164, and lie at the same height (below the flange 216). The inspection ports each extend to a location immediately downstream of a main pressure seal 30. The particular depth micrometer 240 shown, has opposite surfaces 242, 244 which engage radially opposite surfaces of the gap passage to measure the radial gap between them. Three gap measurements at the three locations (when the swivel is substantially nonrotating but pressurized) enables a determination of degree of concentricity. It may be noted that U.S. Pat. No. 4,828,292 owned by the present assignee shows a single inspection passage, but a gauge therein measures only the short radially-extending extrusion gap of a face seal. Such short extrusion gap has axially-spaced surfaces, so the width of the gap between them does not indicate concentricity of swivel parts.

Figure 7:
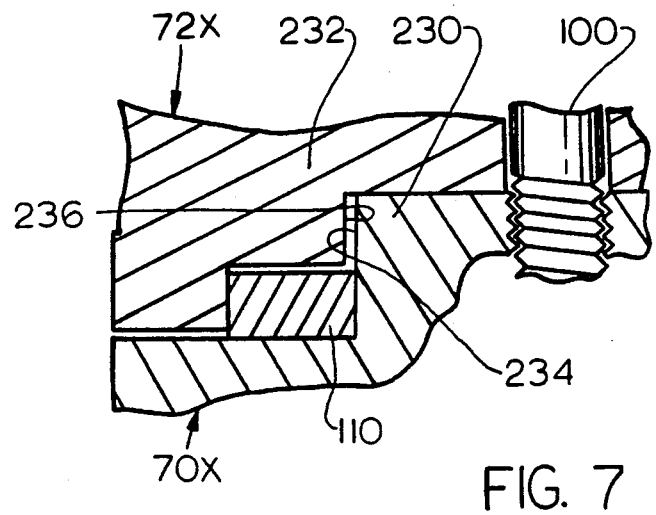
FIG. 7 is a partial sectional view of a fluid swivel similar to that of FIG. 2, but altered to provide registers therefor.

FIG. 7 illustrates a modified form of the fluid swivel of FIGS. 1-3, with the body 70X and seal ring 72X similar to the body 70 and seal ring 72 of FIG. 2. However, the body 70X is formed with a body register 230 which can engage a seal ring register 232. Surfaces 234, 236 on the registers are initially spaced from each other, but engage one another to hold the body and seal ring closely concentric, when a pressure close to that of the design pressure is reached. Thus, for the example given above where the design pressure is 200 atmospheres, the surfaces 234, 236 engage each other when a pressure such as 193 atmospheres is reached.

It should be noted that while terms such as "vertical", "horizontal", "upper", "lower", etc. are used herein to aid in the description of the invention, that the fluid swivel can be operated in other orientations with respect to gravity.

Thus, the invention provides a fluid swivel of the type that has at least one radial pressure seal, which minimizes increase in the thickness of the extrusion gap lying on the downstream side of the seal. This is accomplished by forming one of the structures such as the outer structure, with a separate seal ring or seal abutting ring and separate body. The seal abutting ring, which engages one side of the pressure seal and forms one side of the extrusion gap that lies on the downstream side of the pressure seal, can shift radially with respect to the body. A rubber sheet between the seal ring and body can assure low friction shifting. A centering mechanism urges the seal ring to remain substantially concentric with the body even as the body expands in radius by more than the seal ring. Registers can be located on the inner and/or outer body and on the rub and/or seal ring, which engage each other to hold the ring concentric to the body, when a predetermined high pressure of at least about 50 atmospheres lies in the annular chamber of the fluid swivel. A plurality of inspection ports extending to the gap can measure concentricity of the inner and outer seal rings.

Although particular embodiments of the invention have been described and illustrated herein, it is recognized that modifications and variations may readily occur to those skilled in the art, and consequently, it is intended that the claims be interpreted to cover such modifications and equivalents.

I claim:

1. A high pressure fluid swivel with inner and outer structures and at least one bearing rotatably connecting said structures to hold them together and enable them to rotate with respect to each other about an axis, said structures forming an annular chamber between them and at least one gap passage between them extending from at least one side of said chamber, and said swivel has at least one redial pressure seal along said gap passage which has opposite sides bearing respectively against said inner structure and said outer structure, characterized by:

a first of said structures includes a first body forming part of said chamber and having a first end with said gap passage extending to said body first end, said first structure also including a first seal ring which bears against one side of said pressure seal to seal thereto and which forms one side of the gap passage portion lying immediately downstream of said pressure seal, said first structure also including a connecting device that connects said seal abutting ring to said body end but which allows said seal abutting ring to shift with respect to said body end in a radial direction with respect to said axis to enable differential expansion of said body and said seal abutting ring when there is a large change in fluid pressure in said annular chamber.

2. The fluid swivel described in claim 1 wherein: said body and said seal abutting ring each has a register, said registers positioned so when they engage each other they position said seal abutting ring concentric with said body, said registers positioned to engage each other only when the pressure in said annular chamber reaches a predetermined high pressure which is at least 50 atmospheres.

3. The fluid swivel described in claim 1 including:
a centering mechanism coupling said body to said seal abutting ring, which urges said seal abutting ring radially to keep it substantially centered on said body as locations on said body shift radially when there is a change in the pressure of fluid in said annular chamber.

4. The fluid swivel described in claim 3 wherein:
said body and said seal abutting ring each forms a part of said first structure, with one of said parts having a primarily radially-facing surface;
said centering mechanism comprises a leaf spring extending from another of said parts and having an outer end bearing against said surface of said one of said parts.

5. The fluid swivel described in claim 3 wherein:
said body and said seal abutting ring each have shoulders, with said shoulders being radially spaced and facing radially toward each other;
said centering mechanism comprises a quantity of material substantially in a block form as seen in a sectional view that includes said axis, and said block form extends between and abuts said shoulders, said block from having an effective modulus of elasticity in compression which is less than half that of the material of said body.

6. The fluid swivel described in claim 5 wherein:
each of said shoulders extends in a circle about said axis, and said block form comprises a ring of material having a multiplicity of holes to make it more compressible.

7. The fluid swivel described in claim 3 wherein:
said first structure comprises said outer structure which expands away from said axis as the pressure of fluid in said annular chamber increases, said centering mechanism comprises a spring device which is mounted on said body and which has at least three spring locations spaced about said axis which each resiliently biasing said seal abutting ring toward a position of concentricity with said body, with a force that increases as said body locations move further from said axis during an increase in fluid pressure in said chamber.

8. The fluid swivel described in claim 1 including:
a layer of elastomeric material lying between and compressed between said seal abutting ring and said body first end.

9. The fluid swivel described in claim 1 wherein:
said seal abutting ring has a plurality of inspection ports spaced about said axis, each port extending axially through said seal abutting ring to a location along said gap passage immediately downstream of said pressure seal; and including
a depth gauge which is narrow and long enough to fit through any of said inspection ports, and which has surfaces that can engage radially spaced opposite sides of said gap passage to determine the size of the gap between them.

10. A method for operating a fluid swivel which has inner and outer structures and at least one bearing rotatable connecting said structures to enable said outer structure to rotate about said inner structure, wherein said structures form an annular chamber between them, at least one gap passage between them extending from at least one side of said chamber, and at least one radial pressure seal along said gap passage which has opposite sides bearing respectively against said inner structure and said outer structure, characterized by:
constructing a first of said structures with a body that forms part of said chamber and that has a first end to which said gap passage extends, and with a separate seal abutting ring that lies substantially against said body end, wherein said seal abutting ring bears against one side of said pressure seal and forms one side of the portion of said gap passage lying immediately downstream of said pressure seal;
said step of constructing including mounting said seal abutting ring on said body end to enable said seal abutting ring to shift radially thereon, to thereby enable less radial expansion of said seal abutting ring than of said body when there is a large change in fluid pressure in said annular chamber.

11. The method described in claim 10 including:
resiliently biasing said seal abutting ring toward a position of concentricity with said body as said body expands in diameter with a change in fluid pressure in said annular chamber.

12. The method described in claim 10 wherein said first structure is said outer structure, and including:
constructing said body and seal abutting ring each with spaced primarily radially facing registers that face each other, including positioning said registers so they engage each other when the pressure in said annular chamber reaches a predetermined pressure of at least 50 atmospheres, with said registers positioned to hold said body and seal abutting ring concentric when said registers engage each other;
applying pressured fluid to said chamber at a pressure of at least 50 atmospheres, and allowing the diameter of said body at said register thereon, to expand until said body register engages said seal abutting ring register.

13. The method described in claim 10 wherein:
said step of constructing includes placing a sheet of elastomeric material between said body end and said seal abutting ring, and allowing said sheet to deform and continue to couple said body end and seal abutting ring and seal the space between them as said body expands in radius by more than said seal abutting ring.

14. A fluid swivel comprising:
ring-shaped inner and outer structures, said outer structure surrounding said inner structure, said structures forming an annular chamber therebetween and a pair of gap passages extending from opposite sides of said annular chamber;
first and second radial pressure seals, each disposed along one of said gap passages and having radially opposite sides seal to different of said structures to block fluid flow through a corresponding one of said gap passages;
a bearing connecting said structures to allow said outer structure to rotate about a vertical axis with respect to said inner structure;
at least one of said structures includes a body forming part of said annular chamber with said body having opposite ends spaced apart parallel to said axis, two seal abutting rings each lying at a different one of said body ends and engaged with one of said sides of one of said pressure seals, and a connector connecting each seal abutting ring to a corresponding body end with each of said seal abutting rings being radially shiftable on the corresponding body end;

said body of said one structure having a radially facing body register at each of said body ends thereof, and each of said seal abutting rings of said one structure having a radially facing register facing a corresponding one of said body registers;

each corresponding pair of said registers being slightly radially spaced apart, to abut each other and thereby position each of said seal abutting rings concentric with said body, only after said annular chamber contains fluid at a predetermined fluid pressure which is at least 50 atmospheres.

15. The fluid swivel described in claim 14 including:

means coupling each of said seal abutting rings to said body, for resiliently urging each of said seal abutting rings toward positions concentric with said body.

16. The fluid swivel described in claim 14 including:

a sheet of elastomeric material lying between each of said body ends and each corresponding one of said seal abutting rings.

17. A fluid swivel comprising:

ring-shaped inner and outer structures, said outer structure surrounding said inner structure, said structures forming an annular chamber therebetween and a gap passage extending from opposite sides of said annular chamber;

first and second radial pressure seals, each disposed along one of said gap passages and having radially opposite sides sealed to different of said structures to block fluid flow through a corresponding one of said gap passages;

a bearing connecting said structures to allow said outer structure to rotate about a vertical axis with respect to said inner structure;

said outer structure including a body forming part of said annular chamber and having axially spaced opposite ends, said outer structure also including a pair of outer seal abutting rings each lying substantially against a different one of said body ends and radially shiftable thereon, and said outer structure also including a connector connecting each of said outer seal abutting ring to said body, with each seal abutting ring lying against one side of one of said pressure seals and forming one side of the gap passage portion immediately downstream of said pressure seal;

centering means coupling said outer body to each of said outer seal abutting rings, for urging each of said outer seal abutting rings toward a position centered on said body.

18. The fluid swivel described in claim 17 including:

a pair of registers, one lying on one of said seal abutting rings and facing radially inwardly and the other lying on a corresponding end of said body and facing radially outwardly and slightly spaced from said one register to engage it and hold said body and one seal abutting ring concentric when said annular chamber contains fluid at a predetermined high pressure of at least about 50 atmospheres.

19. A high pressure fluid swivel system which includes inner and outer structures and at least one bearing rotatably connecting said structures to enable them to rotate with respect to each other about an axis, said structures forming an annular chamber between them and at least one gap passage between them extending from at least one side of said chamber, and said swivel has at least one radial pressure seal along said gap passage which has opposite sides bearing respectively against said inner structure and said outer structure, characterized by:

a first of said structures has at least three inspection ports at substantially the same height but spaced about said axis, each port extending primarily radially from the outside of said structure to said gap passage and being wide enough to received a gauge, to enable a determination of the concentricity of the structure at said height.

20. The system described in claim 19 including:

a depth gauge which is narrow and long enough to fit through any of said passages, and which has surfaces that can engage radially spaced opposite surfaces of said gap passage.

* * * * *